H. A. WISEMAN.
PICTURE FILM PERFORATOR.
APPLICATION FILED MAR. 16, 1915.
1,179,885.
Patented Apr. 18, 1916.
2 SHEETS—SHEET 1.
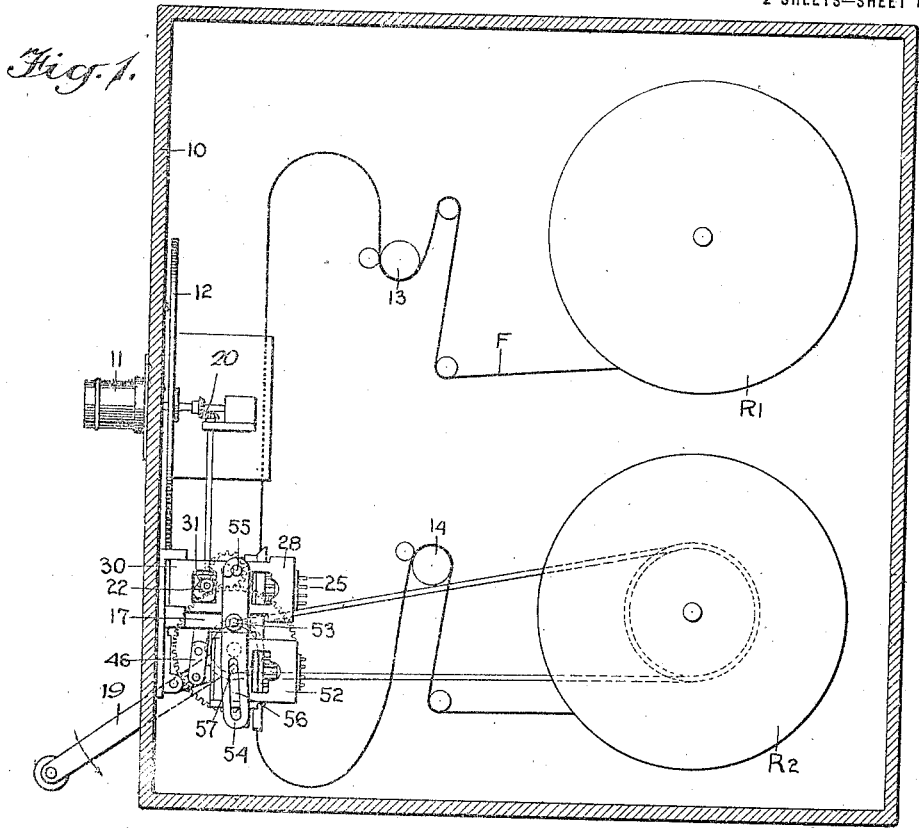
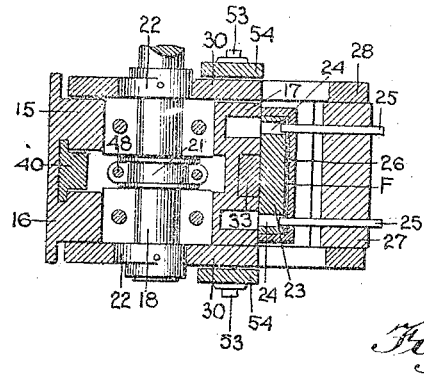
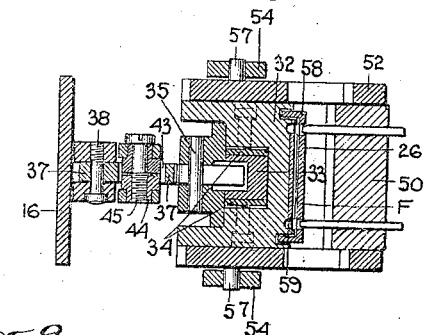
WITNESSES
INVENTOR
Herbert A. Wiseman
BY
ATTORNEYS H. A. WISEMAN.
PICTURE FILM PERFORATOR.
APPLICATION FILED MAR. 16, 1915.
1,179,885.
Patented Apr. 18, 1916.
2 SHEETS—SHEET 2.
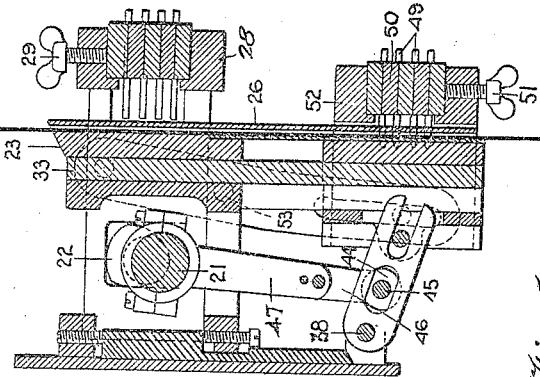
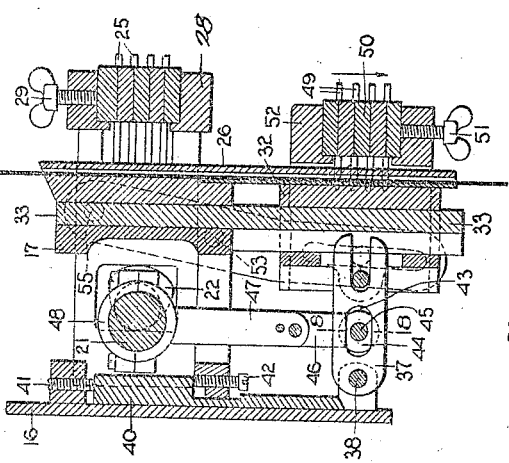
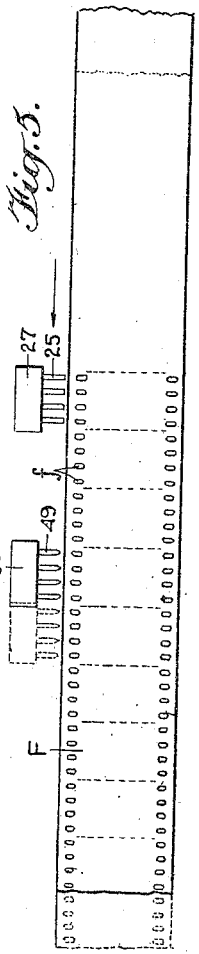
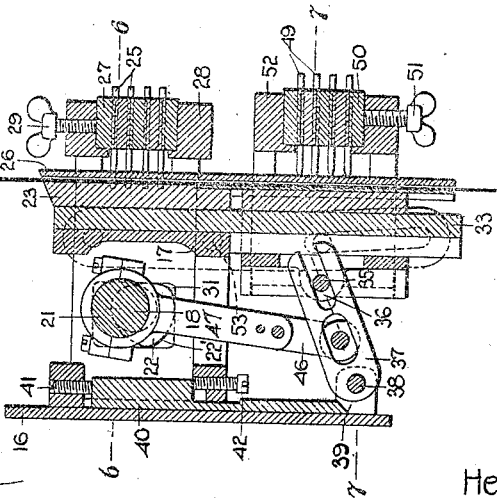
WITNESSES
INVENTOR
Herbert A. Wiseman
BY
ATTORNEYS

UNITED STATES PATENT OFFICE.

HERBERT AUGUSTUS WISEMAN, OF NEW YORK, N. Y., ASSIGNOR TO HIMSELF, ELIJAH DAVIS, AND SAMUEL E. DAVIS, COPARTNERS TRADING AS WISEMAN & DAVIS PERFECT PERFORATING FILM MACHINE COMPANY, OF BROOKLYN, NEW YORK.

PICTURE-FILM PERFORATOR.

1,179,885.  Specification of Letters Patent.  Patented Apr. 18, 1916.

Application filed March 16, 1915. Serial No. 14,646.

*To all whom it may concern:*

Be it known that I, HERBERT AUGUSTUS WISEMAN, a citizen of the United States, and a resident of the city of New York, borough of Brooklyn, in the county of Kings and State of New York, have invented a new and Improved Picture-Film Perforator, of which the following is a full, clear, and exact description.

This invention relates to moving picture apparatus and has particular reference to means for perforating the film simultaneously with the taking of the picture.

Among the objects, therefore, of the invention is to provide a combined moving picture camera and punching device, said punching device serving not only to perforate the film, but to actuate the film in step-by-step movement with respect to the camera lens.

The foregoing and many other objects of the invention will hereinafter be more fully described and claimed and illustrated in the drawings forming a part of this specification in which like characters of reference indicate corresponding parts in all the views, and in which—

Figure 1 is a vertical sectional view of a moving picture camera made in accordance with this invention, the view being largely diagrammatic in nature; Fig. 2 is a substantially central vertical section at right angles to the operating shaft; Figs. 3 and 4 are similar views showing successive positions of the movable parts; Fig. 5 is a diagram indicating the relation of the punch and feeding mechanism to the moving film; Fig. 6 is a horizontal section on the line 6—6 of Fig. 2; Fig. 7 is a similar view on the line 7—7; and Fig. 8 is a vertical detail in section on the line 8—8 of Fig. 3.

The several parts of this device may be made of any suitable materials, and the relative sizes and proportions, as well as the general design of the mechanism, may be varied to a considerable extent without departing from the spirit of the invention hereinafter more fully described and claimed. It is to be understood also that the terms "vertical" and "horizontal" as used herein are to be considered in a relative sense only, since the mechanism is adapted for use in various positions with respect to the vertical.

As shown in Fig. 1, 10 indicates a camera casing having an optical lens 11 and a rotary shutter 12, and indicating a film F operating between reels $R^1$ and $R^2$. The parts thus far described may not differ essentially from similar parts of known machines, and as heretofore the film may be guided and operated by suitable tension and loop-setting devices shown at 13 and 14.

In the usual practice of moving picture cameras, it is necessary for the film to be perforated at some time prior to the introduction of the film to the machine; hence, it is frequently a source of annoyance and loss of advantage when means are not convenient for the perforating of the film which, being sensitized, must be handled in a dark room. By providing a punching device to be used as the feeder for the film with respect to the axis of the lens in camera, I avoid the disadvantages above suggested and am able to introduce an unperforated sensitized film directly into the camera at the reel $R^1$. Then, by threading it along the devices 13 and through the shutter casing and starting it through the combined feeding and punching devices, the operation is ready to begin.

The punching and feeding mechanism may be constructed in various ways within the scope of the invention, but as a suitable embodiment of such mechanism I illustrate a frame 15 having a base 16 serving to secure the device in position with respect to the camera casing 10, the frame also including a pedestal 17 in which is journaled transversely a driving shaft 18. This shaft 18 may be rotated at suitable speed by any desirable means, such means being indicated as including a crank 19, and gearing 20 between said shaft and the shutter shaft serves to rotate the shutter in synchronism with the rotation of the power shaft. The power shaft is provided at its central portion with an eccentric 21 and on either side thereof it is provided with a cam 22.

The punching devices include a bed plate 23 having two sets of vertically arranged holes 24, four holes in each set, for coöperation with two gangs of punches 25, four punches in each gang. These features are of standard form and arrangement with respect to spacing. The face plate 26 is secured over the bed plate at a slight space providing for the movement of the film F between the same, as shown in Fig. 6. The punches 25 are secured in a block 27 comprising a plurality of plates locked together in operating position in a cage 28 provided for horizontal reciprocations in or along the pedestal 17. The block 27 is shown locked in position in the cage by set screws 29.

The cage 28 comprises two parallel side plates 30 having oppositely disposed slots 31 in which the aforesaid cams 22 operate. The length of each slot 31 is equal to substantially twice the maximum radius of the cam therein, and the width of the slot is substantially equal to the width of the cam. Each cam 22 has two active faces extending outwardly to the arc-shaped face 22' which is of sufficient length circumferentially to permit a substantially half rotation of the shaft 18 to take place before either cam face acting upon the side walls of the slot 31 will shift the cage and punches. Referring to Figs. 2, 3 and 4 in this connection, the cams 22 are in the position assumed by them when about to throw the punches outwardly, one of said cam surfaces bearing on the outer wall of the slot 31. When the shaft makes a further rotation, the cams move the punches out of the path of the film where they remain during the next quarter turn of the shaft as shown in Fig. 4, at which time the cams will act to throw the cage and punches inwardly again, causing the points of the punches to again perforate the film. In other words, with suitable means to cause the movement of the film step by step, the punches are caused to perforate the same, making eight holes or two sets of four holes each at each reciprocation. The reciprocation of the cage and punches is always in right transverse to the axis of the shaft.

The step-by-step feeding devices include a cross head 32 slidable vertically along a fixed guide bar 33 secured to the main pedestal 17. Provision for wear and proper fit between the guide bar and the cross head is had through a pair of adjustable plates 34 shown in cross section in Fig. 7. A transverse pin 35 is connected to bearing lugs 36 extending from the cross head. A lever 37 having one end bifurcated and straddling the pin 35 is connected at its other end at 38 to an adjustable fulcrum 39. This fulcrum includes a shank 40 arranged adjustably parallel with respect to the base 16 and is adapted to be secured in any desired position longitudinally thereof by set screws 41 and 42. When fixed in position, however, the fulcrum block 39 may be regarded as a fixed support for the lever 37. The lever is provided intermediate its ends with a slot 43 in which is secured a two-part clamp 44, the clamping being effected through a screw 45. The outer ends of the clamp members constitute trunnions on which the arms 46 of a connecting rod 47 are journaled. The clamping action of the screw 45 serves to fix the block with its trunnions at a definite distance from the axis of the pivot 38. The connecting rod 47 is connected to the eccentric 21 by means of a strap 48 and through which the lever 37 is oscillated around the pivot 38 and thereby causing the cross head to reciprocate to and fro along the guide bar 33, making a complete to-and-fro movement at each rotaion of the main shaft. By varying the position of the block 44 toward or from the axis of the pivot 38, the extent of reciprocatory movement of the cross head may be delicately determined, and by varying the position of the pivot 38 through the screws 41 and 42, effective distances between the punches and the step-by-step mechanism may be accurately determined.

The feeding devices include a plurality of fingers 49 shown preferably arranged with respect to one another precisely the same as the punches and likewise carried by a series of plates forming a block 50 clamped by set screws 51 in a cage 52 guided for reciprocations in the cross head 32 and movable at right angles to the movement of the cross head along the guide bar. On opposite sides of the pedestal 17 are pivoted at 53 a pair of levers 54, the upper ends of which are connected by pivots 55 to the punch supporting cage 28, and, hence, when the cage 28 is reciprocated with respect to the pedestal 17 by the action of the cams 22, the levers 54 are given a positive oscillation around their said pivots 53. The lower ends of the levers 54 are bent slightly at an angle to the main portions of the levers and are provided with longitudinal slots 56 through which connection is made through pins 57 with the cage 52. Therefore, simultaneously with the reciprocation of the cage 38 in either direction, the cage 52 will be reciprocated in the opposite direction. The punches 25 and the fingers 49 will, therefore, be caused to engage the film in alternation. It will furthermore be seen that while the punches are in engagement with the film holding it steady, the cage 52 will be elevated, carrying with it the fingers 49, bringing said fingers into registry with previously punched holes, this movement of the cage 52 being effected through the action of the eccentric 21, and then, by the time the cage 52 is moved downwardly, the punches 25 will have been withdrawn free from the film. The fingers 49 are therefore given a compound movement or a movement of reciprocation both toward and from the film and also longitudinally of the film, the points of the fingers 49 making a complete circuit, once for each rotation of the shaft. The slight angle formed in the levers 54 provides for a movement of the cross head 32 in a direction substantially parallel to the base 16 while the fingers 49 are in engagement with the film. The points of the fingers are preferably slightly tapered to facilitate their passage into and through the holes $f$ previously formed in the film, and such points operate along slots 58 formed in the face plate 26 and grooves 59 formed in the bed plate 32. See Fig. 7.

I claim:

1. The herein described moving picture film perforating machine, the same comprising a fixed pedestal, a shaft journaled therein, a cage reciprocating along the pedestal toward and from the shaft, a plurality of punches carried by said cage for perforating the film, a second cage, a plurality of film feeding fingers carried by the second cage, and means actuated by said shaft and the first mentioned cage for causing the second cage with the fingers to move longitudinally of the film out of contact therewith toward the first mentioned cage, thence in directions transverse to the film causing the fingers to engage in perforations, and thence longitudinally causing movement of the film, said shaft-actuating means comprising a lever pivoted to one end to a fixed point and having pin and slot connections between its other end and the second-mentioned cage, and a connecting rod between the power shaft and said lever.

2. The herein described moving picture film perforating apparatus, the same comprising a fixed pedestal, a power shaft journaled therein, a cage reciprocating along the pedestal, a series of punches carried by the cage for forming perforations, cam devices operated by the shaft to reciprocate the cage, a second cage, a plurality of feeding fingers carried by the second cage and movable into engagement with the film in alternation with the action of the punches thereon, and means actuated from the shaft and first mentioned cage to cause the movements of the feeding fingers, said shaft-actuating means comprising an eccentric and mounted on the shaft, a connecting rod journaled on the eccentric at one end, a lever connected to the other end of the connecting rod, and a pin and slot connection between the lever and the second cage.

3. In an apparatus for perforating a moving picture film, the combination of a fixed pedestal, a cage movable along the pedestal in right lines, a series of punches carried by the cage, means acting from the shaft to cause the reciprocations of the cage, a second cage, means pivoted on the pedestal and having the opposite ends thereof pivoted to the two cages whereby reciprocation of the second cage is caused from the first cage in an opposite direction, and means acting from the shaft to cause the reciprocation of the second cage in lines parallel to the film simultaneously with the aforesaid reciprocations.

4. In a film perforating machine, the combination of a fixed pedestal, a shaft journaled therein, a plurality of punches movable along the pedestal toward and from the shaft, film feeding devices acting upon the film in alternation with the punching devices, means to actuate the feeding devices from the shaft, said last mentioned means including an oscillating lever, and means to vary the fulcrum of the lever with respect to the pedestal whereby the effective distance between the punching devices and the feeding devices may be varied.

5. In a film perforating machine, the combination of a fixed pedestal, a shaft journaled therein, a plurality of punches movable along the pedestal toward and from the shaft, film feeding devices acting upon the film in alternation with the punching devices, means to actuate the feeding devices from the shaft, said last mentioned means including a lever pivoted at one end and having pin and slot connection with the feeding devices at the other end, and connections between the shaft and said lever, such connections including a pivot block adjustable toward or from the pivot of the lever whereby the extent of throw of the feeding devices in directions parallel to the film may be increased or diminished.

In testimony whereof I have signed my name to this specification in the presence of two subscribing witnesses.

HERBERT AUGUSTUS WISEMAN.

Witnesses:
 FRANK B. O'NEILL,
 SAMUEL E. DAVIS.